United States Patent
Sigmund

(10) Patent No.: US 9,488,825 B2
(45) Date of Patent: Nov. 8, 2016

(54) LONG-RANGE OPTICAL DEVICE

(71) Applicant: Swarovski-Optik KG., Absam (AT)

(72) Inventor: Georg Sigmund, Völs (AT)

(73) Assignee: Swarovski-Optik KG. (AT)

( * ) Notice: Subject to any disclaimer, the term of this patent is extended or adjusted under 35 U.S.C. 154(b) by 173 days.

(21) Appl. No.: 14/302,853

(22) Filed: Jun. 12, 2014

(65) Prior Publication Data

US 2015/0234172 A1    Aug. 20, 2015

(30) Foreign Application Priority Data

Jun. 12, 2013   (AT) .............................. A 50383/2013

(51) Int. Cl.
*G02B 23/00*        (2006.01)

(52) U.S. Cl.
CPC ................................... *G02B 23/145* (2013.01)

(58) Field of Classification Search
CPC .............. F41G 1/16; F41G 1/00; F41G 3/00;
F41G 11/005; F41G 11/00; F41G 1/033;
F41G 1/24; G02B 7/023; G02B 23/145;
F41C 23/16; F41C 23/02; F41C 23/18;
F41C 23/22; F41C 27/00; F41C 33/0254;
F41C 33/029; G01C 3/04
USPC ....... 359/362, 399, 401, 421, 422, 423, 424,
359/428, 429, 431, 432, 434; 42/111, 119,
42/120, 122, 124, 125, 126, 130, 135, 136,
42/137, 138, 139
See application file for complete search history.

(56) References Cited

U.S. PATENT DOCUMENTS

| | | | |
|---|---|---|---|
| 2,189,766 | A | 2/1940 | Unertl |
| 5,463,495 | A | 10/1995 | Murg |
| 5,615,487 | A | 4/1997 | Tomita |
| 5,771,623 | A | 6/1998 | Pernstich et al. |
| 2006/0254115 | A1 | 11/2006 | Thomas et al. |
| 2008/0002266 | A1 | 1/2008 | Pai |

FOREIGN PATENT DOCUMENTS

| | | |
|---|---|---|
| EP | 0654650 B2 | 2/2001 |
| EP | 0709705 B1 | 1/2003 |
| EP | 1431699 A2 | 6/2004 |
| TW | 200819711 A | 5/2008 |

*Primary Examiner* — Bumsuk Won
*Assistant Examiner* — Wen Huang
(74) *Attorney, Agent, or Firm* — Lerner, David, Littenberg, Krumholz & Mentlik, LLP

(57) ABSTRACT

The invention relates to a long-range optical device, in particular a sighting telescope, comprising an outer housing in which a reversal system is disposed between an objective lens and eyepiece, and having an adjusting mechanism for adjusting the sighting line by adjusting at least one optical component inside the outer housing, and having a resetting mechanism acting on the optical component which has at least one spring in order to generate the restoring force. The resetting mechanism comprises at least one lever which transmits the spring force of the spring to the optical component.

20 Claims, 5 Drawing Sheets

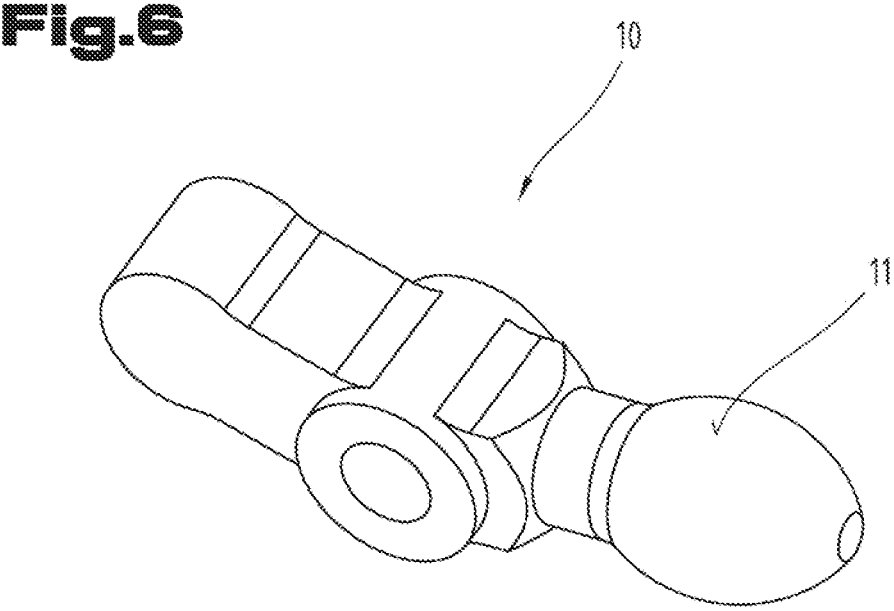
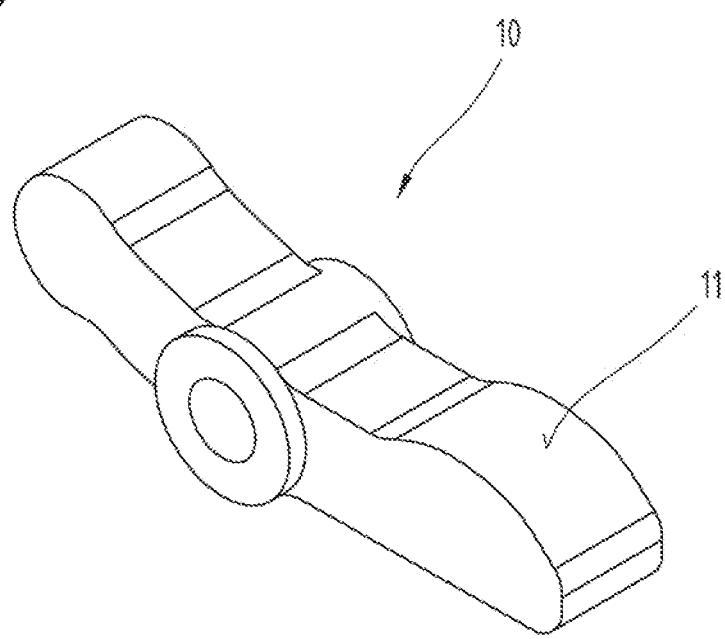

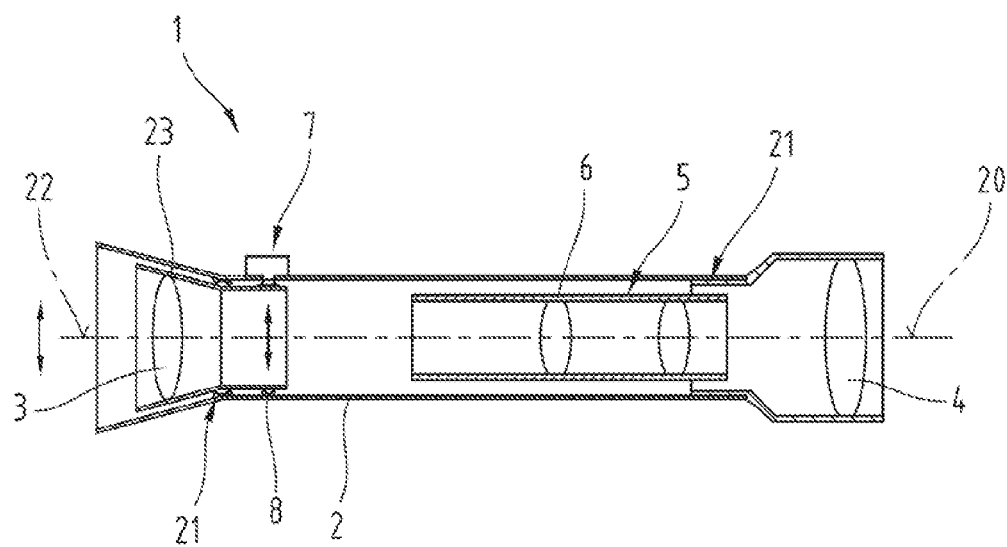

LONG-RANGE OPTICAL DEVICE

BACKGROUND OF THE INVENTION

The invention relates to a long-range optical device, in particular a sighting telescope, comprising an outer housing in which a reversal system is disposed between the objective lens and eyepiece, and having an adjusting mechanism for adjusting the sighting line by adjusting at least one optical component inside the outer housing and a resetting mechanism acting on the optical component which comprises at least one spring for generating the restoring force.

In long-range optical devices, in particular sighting telescopes of the type used for firearms for example, the sighted target is imaged in the objective lens plane laterally reversed and upturned. A reversal system disposed between the objective lens and eyepiece rights the image and reproduces it in the eyepiece plane, where it is viewed. The reversal system usually comprises at least two optical elements, e.g. what are known as cemented lenses, which are disposed at a distance from one another. The optical elements of the reversal system are grouped in an inner housing, also referred to as a mount or auxiliary tube. The reversal system therefore constitutes a component unit which is mounted inside the long-range optical device so that it can be adjusted.

In the case of long-range optical devices such as sighting telescopes, especially those used on weapons, a reticle (crosshairs, bar pattern or similar) is provided as an aid to sighting the target. The reticle is disposed either in the objective-end (first) or ocular-end (second) image plane or may also be reflected into the optical path.

In the case of sighting telescopes, a known approach is to provide adjusting mechanisms, known as "turrets", which enable the sighting line in the sighting telescope to be adjusted in the vertical and/or in the horizontal direction. It is usually either the reticle or target mark that is adjusted or the objective lens. Accordingly, the sighting telescope, which is "test fired" for specific ammunition and a specific range for example, can be readjusted so that accurate shots can be fired at a target even at a different range and/or with different ammunition. Furthermore, other interference variables can also be compensated, for example an already existing setting angle of the sighting telescope if the target object is disposed at a different height from the marksman, as well as other environmental influences such as wind direction and strength.

To enable windage and elevation corrections to be made to the sighting telescope or to adjust the sighting line, the reversal system or the inner housing in which the reversal system sits must also be mounted so that it can also be adjusted in the telescope tube transversely to the optical axis. The reversal system may therefore be mounted (e.g. by means of a ball joint and (cone) socket) inside the telescope tube so that it is able to tilt. A ball seating for the reversal system is known from EP0654650B2, for example. Based on the prior art, an adjustment is made transversely to the optical axis, in other words the reversal system is tilted, by means of so-called elevation screws, which are usually disposed at a right angle and can be operated by means of adjusting turrets accessible from outside.

Various resetting mechanisms are known from the prior art as a means of resetting the reversal system.

For example, a known approach is to fit helical springs axially in the ball and socket joint. This being the case, however, there is a risk that the ball and socket joint might lift. Furthermore, the spring force varies considerably depending on the position of the reversal system.

Another system uses leaf springs disposed along or transversely in the main tube, which push directly onto the reversal system. If fitted transversely to the main tube, additional space can be made available for the spring by providing a recess in the main tube.

It is difficult to obtain a large adjustment path because of the material properties. Fitting is difficult and the spring force varies considerably depending on the position of the reversal system.

Another known option for a resetting mechanism is a helical spring which is fitted in the main tube radially at an angle of 45° and pushed directly onto the reversal system. A construction of this type is known from U.S. Pat. No. 2,189,766A, for example. The problem in this instance is that space has to be provided for retaining and guiding the spring and the housing therefore has to be made wider. Here too, the spring force is very much dependent on the position of the reversal mechanism. When the adjusting turrets are extracted and the spring is therefore relaxed, there is hardly any spring force available.

Another possibility of adjusting the direction of the sighting line is to leave the reversal system fixed inside the housing and instead mount the objective lens inside the housing so that it is able to pivot or tilt. Such an option is disclosed in EP 0 709 705 B1 or TW 2008 19711 A, for example.

BRIEF SUMMARY OF THE INVENTION

The objective of the invention is to solve the problems associated with the prior art and propose a resetting mechanism whereby the restoring force is not dependent or at least is less dependent on the position or tilt angle of the optical component but is nevertheless sufficiently strong to guarantee reliable resetting at any time. Furthermore, the solution should be based on an arrangement that will save on space. In particular, it should also be possible to obtain greater adjustment paths. Manufacture, fitting, maintenance and replacement should also be simple and inexpensive and, in the case of one embodiment, it should also be possible to retrofit long-range optical devices. The invention and its implementation should be universally applicable, i.e. should not be restricted to specific (target) long-range scope types.

This objective is achieved by means of a long-range optical device of the type mentioned above, in particular a refracting telescope, sighting telescope or scope, due to the fact that the resetting mechanism comprises at least one lever which transmits the spring force of the spring to the optical component.

Accordingly, the spring acts on the lever mechanism, which may be made up of just one or several levers, and the lever mechanism in turn acts on the optical component. In other words, the spring does not act directly on the optical component but via a pivotably mounted lever. The optical component, in particular in the form of a reversal system, constitutes a component unit insofar as it is mounted as a whole in the outer housing of the telescope so that it can be adjusted. This mounting arrangement permitting adjustment enables the optical component to tilt inside the outer housing. To this end, the optical component may be mounted in the outer housing by means of a bearing, e.g. ball seating. The restoring force transmitted by the lever mechanism to the optical component therefore acts transversely to the optical axis of the long-range optical device.

Another advantage in connection with a ball and socket joint resides in the fact that if a ball and socket joint is set without any clearance, virtually no axial force is transmitted by the lever, which reduces friction of the ball surfaces.

By spring is meant any means which flexes under load and is restored when relieved of load, i.e. resumes the original shape. Possible examples are helical springs, leaf springs, air springs, rubber springs and springs made from any other appropriate material. In particular, the spring may act on the lever as a compression spring or tension spring.

In the case of one embodiment (in which the reversal system is mounted in an adjustable arrangement), the at least one optical component on which the adjusting mechanism and resetting mechanism act is the reversal system.

In an alternative embodiment (in which the objective lens is mounted in an adjustable arrangement), the at least one optical component on which the adjusting mechanism and resetting mechanism act is the objective lens.

A (sighting) telescope also usually has a reticle (crosshair, target mark, bar pattern or similar) which is disposed in the optical path or is reflected into it or projected into it.

The at least one lever mounted about a pivot axis deflects the spring force, i.e. the direction of the restoring force acting on the optical component, e.g. the reversal system, tends towards the direction of the spring force.

The point at which the lever or lever mechanism acts on the optical component or its housing (auxiliary tube, mount, holder or similar) is preferably disposed in the region lying opposite the adjusting mechanism. In other words, the resetting mechanism and adjusting mechanism lie opposite one another, i.e. are disposed approximately in one plane. However, the resetting mechanism may also act on the reversal system or objective lens at a different position.

One advantage of the invention resides in the fact that sufficient force is always generated even when the optical component is in the positions deflected out to the maximum, thereby ensuring reliable resetting.

Based on a correct choice of lever translation ratios and spring characteristic, an approximately constant restoring force varying to a less pronounced degree can be obtained across a large range of adjustment of the optical component. Furthermore, the restoring force can be accurately adjusted and defined by the lever translation ratios and spring characteristic. Offering a simple and compact solution, the invention may be used in all possible (sighting) telescopes, and subsequent retrofitting is also possible.

By re-directing the force on the lever, especially in the case of a tilting lever, the spring, which is preferably provided in the form of a compression spring, may be fitted and optionally also guided transversely to or lengthways with respect to the longitudinal extension of the outer housing (main tube or main barrel). At the same time, the invention offers a compact design, thereby enabling bigger adjustment paths to be obtained.

Based on a preferred embodiment of the invention, the lever is provided in the form of a tilting lever. This results in a particularly compact solution which is optimum in terms of obtaining an essentially constant restoring force or one which at least varies to a less pronounced degree over a large range of adjustment.

The force deflection of the at least one lever is preferably at least 90°, preferably between 120° and 150°. This enables integration of the resetting mechanism inside the outer housing in a compact arrangement.

Based on another embodiment of the invention, the lever arm facing the optical component is longer than the lever arm facing the spring. As a result, the change in length or travel of the spring remains shorter than the corresponding resetting distance so that the spring can be used in a linear spring characteristic range. Furthermore, in this embodiment, the pivot axis of the lever is disposed closer to the spring so that compact components can be used for both the mount for the spring and the mount for the lever.

In one embodiment, the optical component, e.g. the reversal system or the objective lens, sits in an inner housing which is disposed inside the outer housing in an adjustable arrangement. The inner housing may be a tube, a mount, a holder or similar and may be made up of one or more parts. The adjustable mount enables an adjustment to be made transversely to the optical axis, as a result of which the optical component is able to tilt inside the outer housing.

The lever preferably lies with one of its arms on the external face of the inner housing. The force is transmitted via a contact point or contact region. The lever is in contact with the inner housing, i.e. lies loosely against it, which means that the construction is not sensitive to shocks (e.g. due to recoil). This enables a simple connection of the resetting mechanism to the optical component and therefore makes fitting, replacement and maintenance easier. It also means that existing telescopes can be retrofitted.

The region of the lever lying against the external face of the inner housing is preferably rounded. This enables the lever head to slide along the inner housing without too high a frictional resistance.

Based on a preferred variant, the region of the lever lying against the external face of the inner housing is a surface with a single curve.

Based on an alternative variant, the region of the lever lying against the external face of the inner housing is a surface with a double curve.

Based on another design, the resetting mechanism has an essentially constant restoring force across at least 50%, preferably across at least 75%, of the maximum range of adjustment of the adjusting mechanism, more preferably across the entire range of adjustment of the adjusting mechanism, or a restoring force which varies by less than 10% in this range. This ensures uniform and reliable resetting.

By preference, the pivot axis of the lever extends transversely, preferably at an angle of essentially 90°, to the optical axis of the long-range optical device. In the case of a helical spring, the latter then extends essentially parallel with the optical axis.

In an alternative embodiment, the pivot axis of the lever extends essentially parallel with the optical axis of the long-range optical device. In the case of a helical spring, the latter then extends transversely to the optical axis.

By preference, the spring is axially guided, preferably in a bore. This allows optimum use to be made of the spring force because the leeway for movement is predefined and any radial bending is prevented.

The spring is preferably a helical spring and the spring is preferably prestressed by compression. In addition to having advantageous characteristic properties, a helical spring can be accommodated in a particularly compact arrangement. The latter is even more of an advantage if a compression spring is used. Naturally, it is possible to use any type of compression spring.

The helical spring is preferably axially guided across the entire range of adjustment, resulting in a stable construction.

The spring and lever are preferably integrated in a unit which can be removed from the long-range optical device and fitted in the long-range optical device as a whole. Not only does this make production easy and fitting uncomplicated, it also enables retrofitting of (target) telescopes of any type based on a corresponding design.

The resetting mechanism preferably has a mounting element in which the spring is accommodated and on which the lever is pivotably mounted, and the mounting element is preferably based on a one-piece design. This ensures a compact and space-saving construction. In terms of elements needed for the resetting mechanism, there are only the spring, lever and mounting element (optionally also intermediate elements on the ends of the spring).

The mounting element is preferably affixed to the internal face of the outer housing, preferably screwed to it. The resetting mechanism is not visible from the outside.

The spring is preferably supported on a wall of the outer housing. As a result, the mounting element may be of an even smaller design because it does not have to be provided with a supporting wall for the spring.

The adjusting mechanism preferably comprises two elevation screws disposed at an angle of essentially 90° with respect to one another. This enables lateral and height adjustments to be made.

The lever preferably acts on the optical component in a region lying symmetrically opposite the arrangement of the two elevation screws. This enables uniform resetting irrespective of the position of the optical component at any one time.

Other variants are conceivable. The tilting lever and spring may be fitted transversely to or lengthways with respect to the main tube. The resetting mechanism (e.g. the tilting lever unit) may be designed as a separate unit which is fitted (subsequently) in the finished sighting telescope or is fitted in the main tube during the normal assembly process.

It would also be conceivable to provide several resetting mechanisms (tilting lever units). For example, two such resetting mechanisms could be disposed opposite each elevation screw so that a separate resetting mechanism is provided for each adjustment direction.

BRIEF DESCRIPTION OF THE DRAWINGS

To provide a clearer understanding, the invention will be described in more detail below with reference to the appended drawings.

These are very schematically simplified diagrams illustrating the following:

FIG. 6 illustrates a preferred design of the lever;

FIG. 7 illustrates another preferred design of the lever;

FIG. 8 illustrates an embodiment of the invention where the adjusting mechanism and resetting mechanism act on the objective lens.

DETAILED DESCRIPTION

Figure 1:
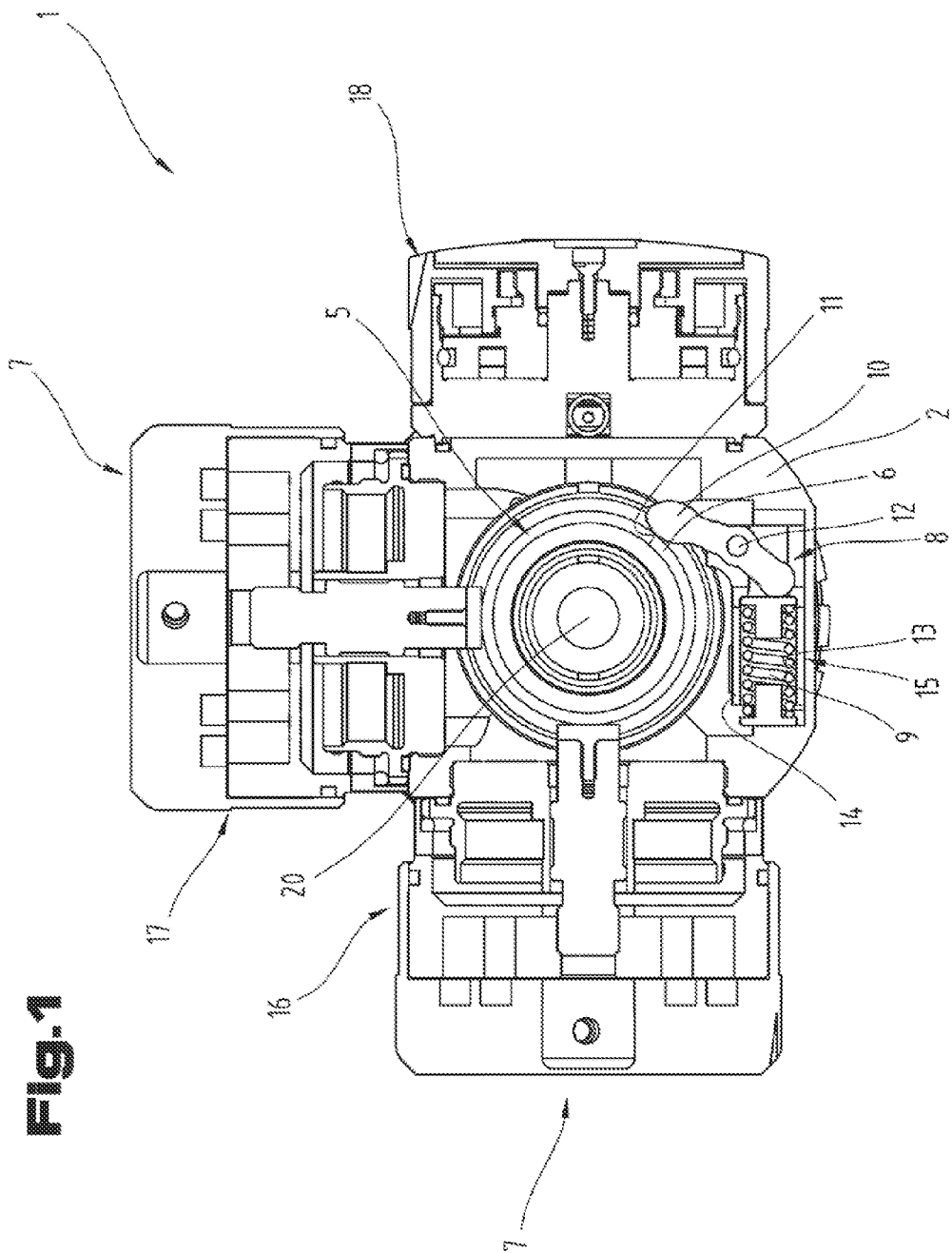
FIG. 1 shows a long-range optical device proposed by the invention in the form of a sighting telescope viewed in section transversely to the optical axis.

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc., relate to the drawing specifically being described and can be transposed in terms of meaning to a new position when another position is being described. Individual features or combinations of features from the different embodiments illustrated and described may be construed as independent inventive solutions or solutions proposed by the invention in their own right.

All the figures relating to ranges of values in the description should be construed as meaning that they include any and all part-ranges, in which case, for example, the range of 1 to 10 should be understood as including all part-ranges starting from the lower limit of 1 to the upper limit of 10, i.e. all part-ranges starting with a lower limit of 1 or more and ending with an upper limit of 10 or less, e.g. 1 to 1.7, or 3.2 to 8.1 or 5.5 to 10.

The embodiments illustrated as examples represent possible variants of the long-range optical device proposed by the invention, and it should be pointed out at this stage that the invention is not specifically limited to the variants specifically illustrated, and instead the individual variants may be used in different combinations with one another and these possible variations lie within the reach of the person skilled in this technical field given the disclosed technical teaching. Accordingly, all conceivable variants which can be obtained by combining individual details of the variants described and illustrated are possible and fall within the scope of the invention.

For the sake of good order, finally, it should be pointed out that, in order to provide a clearer understanding of the structure of a long-range optical device, it and its constituent parts are illustrated to a certain extent out of scale and/or on an enlarged scale and/or on a reduced scale.

The objective underlying the independent inventive solutions may be found in the description.

Above all, the individual embodiments of the subject matter illustrated in the drawings constitute independent solutions proposed by the invention in their own right. The objectives and associated solutions proposed by the invention may be found in the detailed descriptions of these drawings.

The invention will be described with reference to FIGS. 1 to 5 on the basis of an adjustable reversal system, i.e. the sighting line is adjusted by adjusting (tilting) the reversal system. However, the features explained in the description of the drawings below may be applied in the same way to an embodiment (such as that illustrated in FIG. 8) where instead of (or in addition to) the reversal system, the objective lens is mounted so that it can be adjusted (tilted) in order to change the sighting line.

Figure 3:
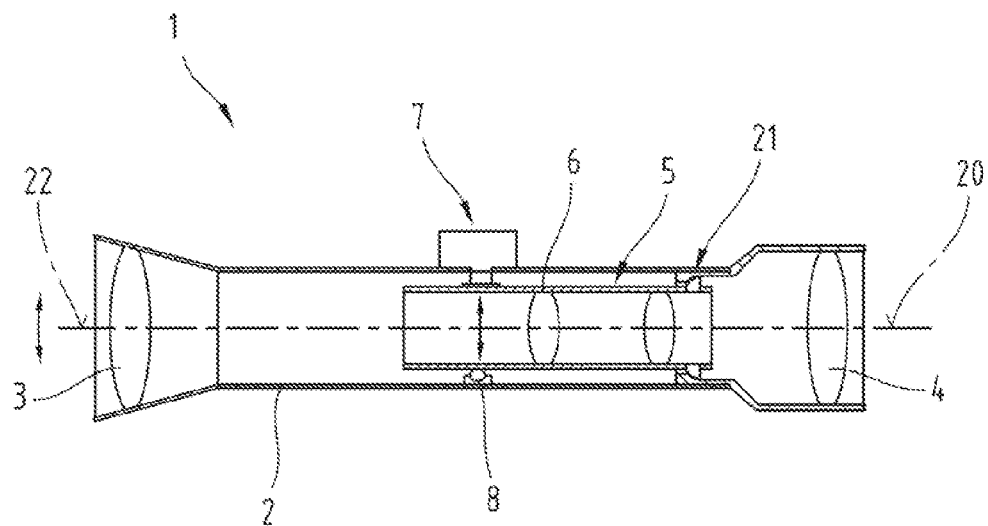
FIG. 3 shows a sighting telescope viewed in section along the optical axis.

FIG. 3 is a very schematic diagram illustrating a long-range optical device 1 in the form of a sighting telescope with an outer housing 2 (main tube), in which a reversal system 5 is disposed between the objective lens 3 and eyepiece 4. The optical elements of the reversal system 5, e.g. two cemented lenses, sit in an inner housing 6 (auxiliary tube). The reversal system 5 together with the inner housing 6 is mounted as a component unit in the interior of the outer housing 2 on a ball seating 21 so that it is able to pivot or tilt. This unit is tilted by displacing it transversely to the optical axis 20 (indicated by the double arrow). This also changes the direction of the sighting line 22, which can be adjusted in a specific way by means of the adjusting mechanism.

In order to adjust the reversal system 5 inside the outer housing 2, an adjusting mechanism 7 is provided which acts on the reversal system 5 and which is illustrated as an adjusting turret on the outside of the telescope.

In order to move the reversal system 5 back along the adjustment path (double arrow), a resetting mechanism 8 is provided, which is preferably disposed at the same height as the adjusting mechanism 7 in the axial direction.

FIG. 1 illustrates a long-range optical device 1 proposed by the invention in the form of a sighting telescope viewed in section transversely to the optical axis 20 and transversely to the optical path. As illustrated, there are two elevation screws 16, 17 which are disposed at a right angle and which can be operated separately from one another by means of adjusting turrets accessible from the outside. When operated, the elevation screws 16, 17 push (e.g. via a plate) on the inner housing 6 of the reversal system 5. An optional adjusting screw 18 enables a lens in the objective lens to be moved for focusing purposes (parallax adjustment).

Figure 2:
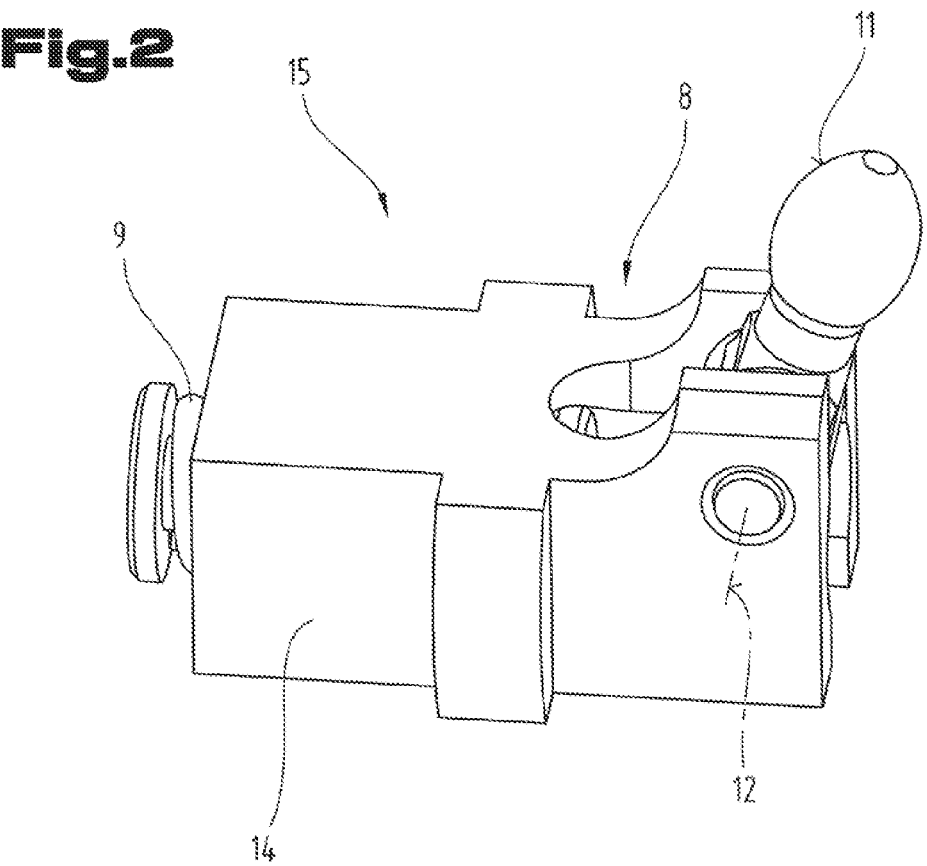
FIG. 2 shows a resetting mechanism proposed by the invention.

The resetting mechanism 8 will now be described in more detail with reference to FIGS. 1 and 2. In order to generate the restoring force, it comprises at least one spring 9 and at least one lever 10 which transmits the spring force of the spring 9 to the reversal system 5. Based on a preferred embodiment, the resetting mechanism has a restoring force which varies by less than 10% across at least 50%, preferably across at least 75%, of the maximum range of adjustment of the adjusting mechanism. By particular preference, the resetting mechanism 8 has an essentially constant restoring force across the entire range of adjustment of the adjusting mechanism 7. All that is needed to achieve this is an appropriate combination of spring (characteristic) and lever dimensioning.

In the case of the embodiment illustrated, the lever 10 is provided in the form of a tilting lever. The force deflection of the lever 10 (angle between the direction of the spring force and the direction of the restoring force at the contact point with the reversal system or its housing) when the reversal system is in the non-operating position (i.e. symmetrical and concentric with the optical axis) is preferably approximately 135°.

The lever arm of the lever 10 lying against the reversal system 5 or its housing 6 is longer than the lever arm of the lever 5 co-operating with the spring 9.

In the embodiment illustrated, the lever 10 lies with one of its arms on the external face of the inner housing 6 and the region 11 of the lever 10 lying on the housing 6 is rounded. In the variant illustrated in FIG. 6, region 11 of the lever 10 lying on the external face of the inner housing 6 has a surface with two curves. In the alternative embodiment illustrated in FIG. 7, the contact region 11 of the lever 10 is a surface with a single curve.

As may be seen from FIG. 1, the spring 9 is axially guided in a bore 13. Naturally, the spring could also be guided in a recess, groove or between rails. The spring 9 is a helical spring, which is prestressed by compression. Terminating elements (of the pad type) are optionally provided at the ends of the spring in order to transmit the force and direct the force in the direction of the lever on the one hand and provide a more uniform support surface on the other hand.

The spring 9 and the lever 10 are integrated to form a component unit 15 which can be removed from the long-range optical device 1 and/or fitted in the long-range optical device 1 as a whole.

The resetting mechanism 8 comprises a mounting element 14 in which the spring 9 is accommodated (and guided) and on which the lever 10 is mounted so as to be pivotable about the pivot axis 12. In the embodiment illustrated as an example, the mounting element 14 is made from a single piece. The mounting element 14 is in turn affixed to the internal face of the outer housing 2, preferably screwed to it.

As may be seen from FIG. 1, the spring 9 is supported on a wall of the outer housing 2. Alternatively, the mounting element 14 could also be designed so that the spring 9 is supported directly against a wall of the mounting element 14.

Figure 4:
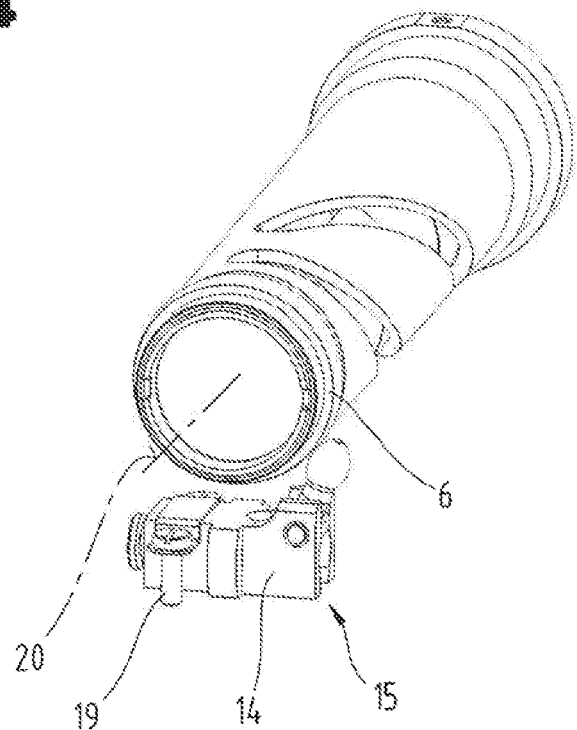
FIG. 4 illustrates one embodiment of the invention.
Figure 5:
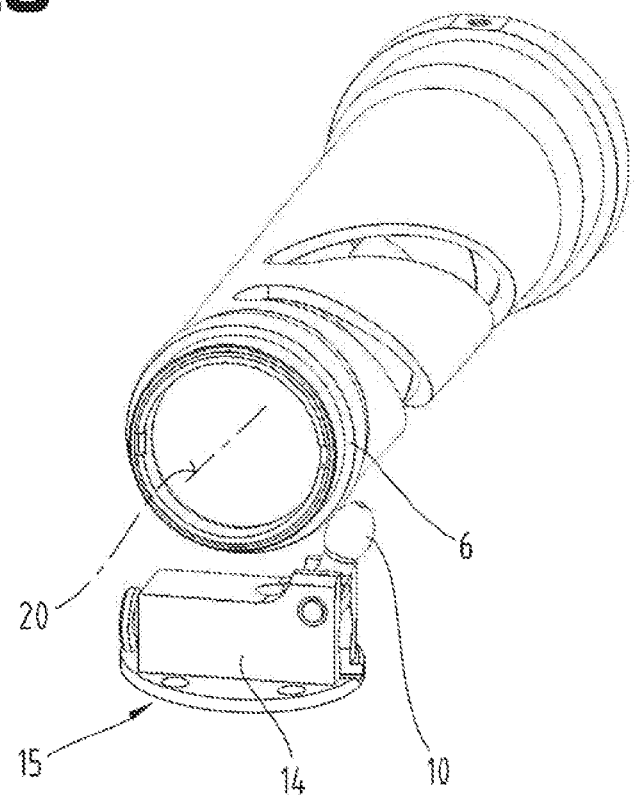
FIG. 5 illustrates another embodiment of the invention.

In the case of the variant illustrated in FIGS. 1, 4 and 5, the pivot axis 12 of the lever 5 is oriented essentially parallel with the optical axis 20 of the long-range optical device 1. The spring 10 extends transversely to the optical axis 20.

Alternatively, the pivot axis 12 of the lever 5 could also extend transversely to the optical axis 20 of the long-range optical device 1, preferably at an angle of essentially 90°. The spring 10 would then extend along the axial direction.

FIG. 4 illustrates a detail with the outer housing (main tube) omitted, showing one option as to how the resetting mechanism 8 may be affixed. Fixing means 19 in the form of two screws fix the mounting element 14 on the outer housing via a clamp.

FIG. 5 illustrates an alternative variant of the fixing means. In this instance, the mounting element 14 has a type of base plate in which holes are provided for screws.

Finally, it should also be pointed out that in the embodiment of the adjusting mechanism 7 illustrated here, there are two elevation screws 16, 17 disposed at an angle of essentially 90° with respect to one another. In the preferred embodiment illustrated in FIG. 1, the lever 10 acts on the reversal system 5 in a region lying symmetrically opposite the arrangement of the two elevation screws 16, 17.

Naturally, it would also be conceivable in principle to provide an adjustment in one direction only. In this case, the resetting mechanism could be disposed exactly opposite the single adjusting mechanism.

FIG. 8 is a schematic diagram similar to FIG. 3 illustrating an alternative embodiment of the invention where the objective lens 3 is mounted so that it can be adjusted inside the outer housing 2 in order to obtain an adjustment of the sighting line 22. The objective lens 3 is retained by an inner housing 23 and can be tilted by means of a ball seating 21. The adjusting mechanism 7 for adjusting the sighting line 22 acts on the objective lens 3 or its housing 23 in this instance. The resetting mechanism 8 likewise acts on the objective lens 3 or its housing 23. The resetting mechanism 8 may be of exactly the same design as that described in connection with the reversal system 5 with reference to FIGS. 1 to 7.

The invention claimed is:

1. An optical device comprising: an outer housing, an objective lens and an eyepiece arranged within the outer housing, a reversal system also arranged within the outer housing and disposed between the objective lens and the eyepiece, an adjusting mechanism arranged at least partially outside of the outer housing to adjust at least one of the objective lens or the reversal system, and a resetting mechanism arranged within the outer housing, the resetting mechanism comprising a spring constructed to generate a restoring force and a lever arranged to transmit the restoring force of the spring to the reversal system, the lever comprising a first lever arm, a second lever arm, and a pivot axis between the first lever arm and the second lever arm, and wherein the spring acts on the second lever arm, and the first lever arm acts on at least one of the objective lens or the reversal system.

2. The optical device according to claim 1, wherein the lever comprises a tilting lever.

3. The optical device according to claim 1, wherein the force deflection of the lever is at least 90°.

4. The optical device according to claim 1, wherein the first lever arm faces the reversal system, and the second lever arm faces the spring, the first lever arm being longer than the second lever arm.

5. The optical device according to claim 1, further comprising an inner housing, wherein the reversal system is arranged within the inner housing which is adjustably mounted inside the outer housing.

6. The optical device according to claim 5, wherein the first or second lever arms is arranged against the inner housing.

7. The optical device according to claim 4, wherein the first lever arm is rounded.

8. The optical device according to claim 7, wherein the first lever has a surface with a single curve.

9. The optical device according to claim 7, wherein the region of the first lever arm has a surface with two curves.

10. The optical device according to claim 1, wherein the resetting mechanism has a restoring force which varies by less than 10% across at least 50% of the maximum range of adjustment of the adjusting mechanism.

11. The optical device according to claim 1, wherein the lever comprises a pivot axis extending transversely to an optical axis of the optical device.

12. The optical device according to claim 10, wherein the pivot axis of the lever extends essentially parallel with an optical axis of the optical device.

13. The optical device according to claim 1, wherein the resetting mechanism comprises a bore, and the spring is arranged for axially movement within the bore.

14. The optical device according to claim 1, wherein the spring comprises a helical spring.

15. The optical device according to claim 1, wherein the resetting mechanism comprises a unit which can be removed from the optical device.

16. The optical device according to claim 1, wherein the resetting mechanism has a mounting element in which the spring is accommodated and on which the lever is mounted so as to be pivotable.

17. The optical device according to claim 16, wherein the mounting element is affixed to an internal face of the outer housing.

18. The optical device according to claim 1, wherein the spring is supported on a wall of the outer housing.

19. The optical device according to claim 1, wherein the adjusting mechanism comprises two elevation screws disposed at an angle of essentially 90° with respect to one another.

20. The optical device according to claim 19, wherein the lever acts on a side of the reversal system that is opposite and symmetrical to the sides to which the two elevation screws act on the reversal system.

* * * * *